United States Patent [19]

Baliozian

[11] 4,019,042
[45] Apr. 19, 1977

[54] LIGHTING DEVICE FOR PHOTOGRAPH OR MOTION-PICTURE PHOTOGRAPHY

[75] Inventor: Mardick Baliozian, Feucherolles, France

[73] Assignee: Tolec, Neuilly-Plaisance, France

[22] Filed: Sept. 19, 1975

[21] Appl. No.: 614,782

[30] Foreign Application Priority Data

Sept. 26, 1974 France .................................. 74.32418

[52] U.S. Cl. ............................ 240/1.3; 240/2 C;
240/41.1; 240/105; 354/126; 354/293
[51] Int. Cl.² .......................................... G03B 15/02
[58] Field of Search ............... 240/1.3, 105, 41.1, 240/2 C; 354/126, 293

[56] References Cited

UNITED STATES PATENTS

| 923,542 | 6/1909 | Losey | 240/1.3 |
|---|---|---|---|
| 2,290,793 | 7/1942 | Alderman | 240/2 C |
| 2,750,489 | 6/1956 | Gibson | 240/1.3 |
| 3,135,471 | 6/1964 | Clapp | 240/41.1 |
| 3,316,804 | 5/1967 | Weisglass | 240/41.1 |

FOREIGN PATENTS OR APPLICATIONS 370,823   3/1923   Germany ............................ 240/1.3

Primary Examiner—Monroe H. Hayes
Attorney, Agent, or Firm—Michael J. Striker

[57] ABSTRACT

In a device for the front lighting of a subject around a camera lens comprising a reflector, the summit of the reflector is truncated and provided with an opening behind which the camera lens can be mounted, the side wall of the reflector being provided with at least one opening with means for mounting an external light source in such a manner as to ensure that the light beam emitted by the light source is projected through the corresponding opening towards the interior of the reflector.

8 Claims, 6 Drawing Figures

LIGHTING DEVICE FOR PHOTOGRAPH OR MOTION-PICTURE PHOTOGRAPHY

BACKGROUND OF THE INVENTION

This invention relates to a lighting device for photography or motion picture photography which is intended to produce an emission of light from a zone which completely surrounds the camera lens.

Such a device is designed to ensure illumination of the subject either without any shadow or with a variable degree of shadow if so required. Moreover, the device is so designed as to make it possible to vary the brightness of reflections from the subject.

There are two methods in use at the present time for the production of shadowless lighting. One of these methods consists in producing light which comes from all directions around the subject in a uniform manner. However, this calls for a very large and costly installation.

Another mode of procedure consists in illuminating the subject in such a manner as to ensure that the shadows cannot be seen by passing the light directly from the axis of the camera lens by means of a semi-transparent and semi-reflecting mirror placed at 45° in front of the latter, a light source being placed on one side at right angles with respect to the axis of the lens. In practice, however, a system of this type is rarely used since its optical adjustment is very difficult and the brightness of reflections is troublesome.

For this reason it has been found preferable to adopt a method of front illumination of the subject by light coming from the zone which surrounds the camera lens. A number of devices designed for this purpose are in any case already in existence but they all have certain disadvantages.

One of these devices consists of a light tube of annular shape which is intended to be placed around the camera lens and may or may not be fitted with an additional reflector. However, if reflectors are employed, they have a low degree of efficiency and, in the case of annular electronic flash tubes, it is found necessary in practice to dispense with the internal reflector on account of the diameter necessary for the camera lens. Morover, the light intensity produced by a device of this type is very limited and the latter does not permit any change in the lighting since there is no possibility of incorporating a means of control due to the shape and small dimensions of a device of this type.

Furthermore, considerable problems are encountered in the case of shiny objects on account of the brightness of reflections. This is due to the fact that the light source has a small surface.

Another device which is employed at the present time for the production of peripheral lighting consists of a fluorescent tube grid having a rectangular shape and intended to be placed around the camera lens, shutters being provided for regulating the quantity of light and changing certain lighting effects.

An apparatus of this type, however, is subject to a certain number of inherent disadvantages. A highly diffused light source cannot be converted to a source of directed light and the power of this apparatus is limited because of the nature of the fluorescent grid. Due to the long length necessary to form the grid, a flash tube cannot be used. Furthermore, an apparatus of this type is not suitable for color photography since the emitted light spectrum is insuitable.

Other devices employed in certain cases comprise a translucent cone of opal material which lights from the outside by one of several independent light sources. The base of the cone is placed against the background provided behind the subject to be illuminated whilst the camera lens is placed in front of an opening formed at the level of the vertex of said cone.

The potential applications of an apparatus of this type are extremely limited, however, and are suitable only for the lighting of close-up still-life pictures. Moreover, part of the light which is projected through the outside of the cone is liable to reach the camera lens and, since the base of the cone is placed against the background, it is impossible to introduce an exposure meter for the purpose of measuring the exposure or to place one's hand in order to rearrange the objects being photographed.

SUMMARY OF THE INVENTION

The lighting device in accordance with the invention is therefore designed to overcome the aforesaid different disadvantages while nevertheless providing peripheral lighting around the camera lens.

This device comprises a hollow reflector of increasing cross-section (for example a reflector having the shape of a pyramid, a cone, etc.) provided with an opening in the truncated summit of the reflector behind which can be placed the camera lens whilst the opaque wall of said reflector has at least one opening a window opposite to which are provided fixing means for mounting an external light source.

Light rays coming from said light source penetrate directly into the interior of the reflector so as to reach mainly the internal face of the side opposite the entrance opening. A certain number of these light rays then undergo a series of successive reflections, thus ensuring even distribution over the entire surface of the reflector and consequently a projection of light towards the front from the entire surface of this latter. Because the very nature of this device (the surface area of the reflector can be extremely large, for example between 1,000 and 15,000 cm$^2$, whereas the emissive area of an annular light tube is only approximately 75 cm$^2$), a considerably larger light emissive area is thus created consequently producing a much softer light without any bright reflections.

In one advantageous form of construction of the device according to the invention, the reflector wall or walls are formed by a number of panel elements which can be disassembled or folded together, thus taking up a small space whilst means are provided for assembling them together in the position of use.

BRIEF DESCRIPTION OF THE DRAWING

Further properties and advantages of the device in accordance with the invention will in any case become apparent from the following description of one example of construction, reference being made to the accompanying drawings which are given solely by way of indication and in which.

SPECIFIC DESCRIPTION OF PREFERRED EMBODIMENTS

Figure 1:
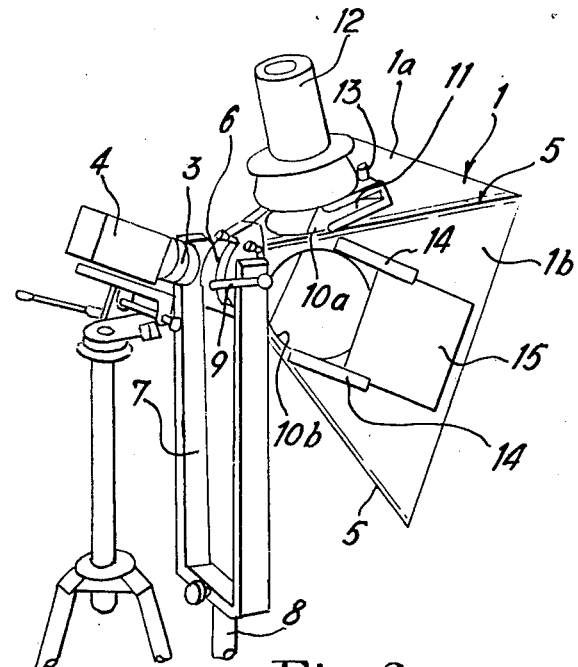
FIG. 1 is a view in perspective showing a lighting device in accordance with the invention, in the position of use.

In the two examples illustrated, the lighting device in accordance with the invention is essentially constituted by a reflector 1 having the shape of a pyramid frustum. The top or summit of the reflector is truncated and provided with an opening 2 behind which can be placed the lens 3 of a corresponding picture-taking apparatus of camera 4.

The angle of inclination of the faces of the reflector 1 can be 120°, for example, with respect to the plane of the opening 2 which is perpendicular to the axis of the complete assembly. The dimensions can be of greater or lesser value. Thus the base of each face can have a width of the order of 25 to 60 centimeters whilst the sides of the opening 2 can have a width of 9 to 13 centimeters. However, these values are mentioned soley by way of indication. The walls of said reflector are formed of opaque, and lightweight material, for example of aluminum sheet or of aluminum-base alloy or alternatively of plastic material. The material employed can be selected so as to ensure that the internal face of the different walls of the reflector has suitable reflectivity. However, in the event that the material employed does not have reflecting properties, the internal face of each of the different walls is provided with a suitable reflecting coating such as, for example, a metallized coating or a white paint.

The reflector under consideration is formed by a plurality of elements corresponding to the different faces or walls of the latter and joined together by means of hinges or sectional assembly strips 5 placed along the arrises of the pyramid. However, these mechanical assembly means may be replaced if necessary by simple adhesive tapes or any other suitable fastening means. This makes it possible to fold back these different elements against each other in a flat position when the device is not in sevice, thus facilitating both storage and transportation.

Figure 2:
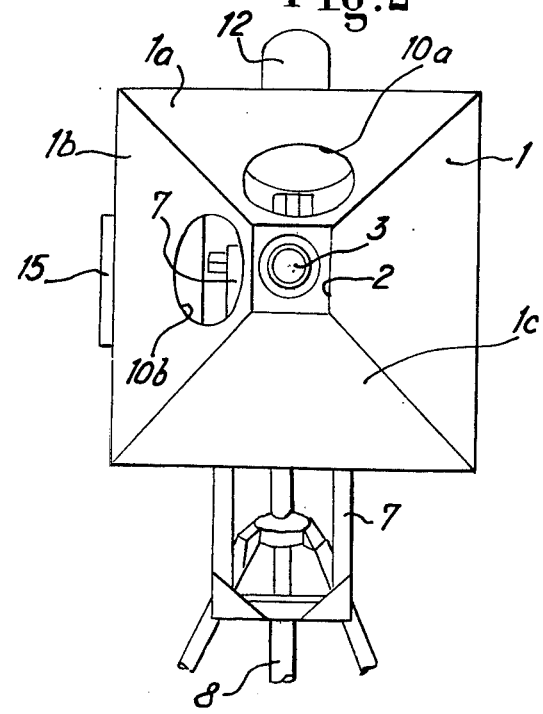
FIG. 2 is a view in frontal elevation of the same device.

In the example of construction shown in FIGS. 1 and 2, the reflector is fitted with an external ring 6 located at its opening 2, that is, at the rear end of the reflector. The ring serves as an intermediate component for mounting the reflector on a suitable support which can be designed if necessary in the form of a fork 7 carried by a leg 8. Accordingly, ring 6 is pivotally mounted on a horizontal pin between the arms of fork 7, provision being made for a locking member actuated by means of an operating handle 9 for locking reflector 1 in the desired position of angular inclination. However, any other suitable system could be employed for orienting the reflection 1 in a suitable manner at the time of use.

Figure 3:
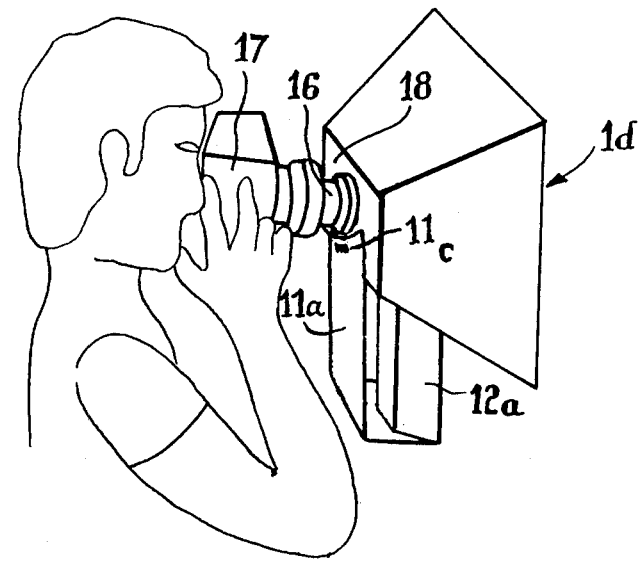
FIG. 3 and 4 show another form of contruction of the device in accordance with the invention.
Figure 4:
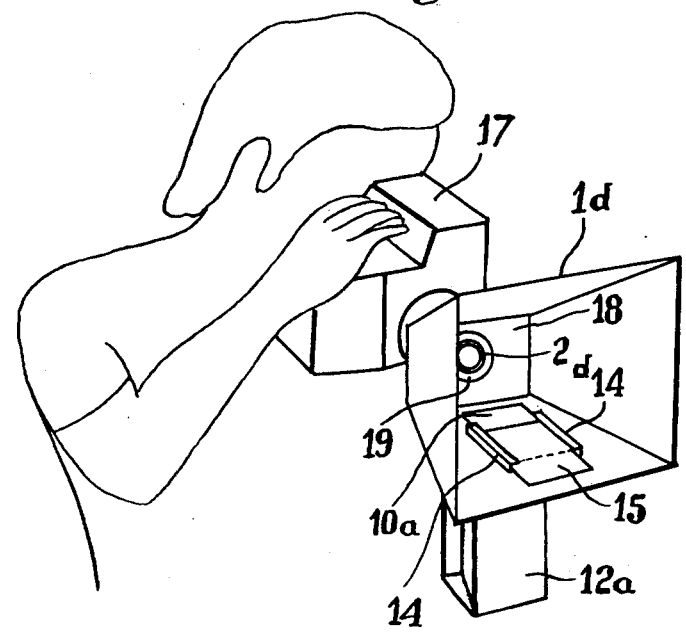

On the other hand, in the embodiment shown in FIGS. 3 and 4, the reflector in accordance with the invention is so designed as to ensure that its truncated rear end portion can be fixed directly on the mount 16 of the lens of a camera 17. In this case an end wall 18 is provided at the truncated rear end of the body of the corresponding reflector 1d and is accordingly provided with an opening 2d which is intended to accomodate the front end of amount 16 of the camera lens, the reflector being fixed on said lens mount by means of a threaded ring 19. In this particular form of construction, the reflector under consideration is intended to be carried by the user at the same time as the corresponding camera as shown in FIGS. 3 and 4 instead of being fixed on a support which rests on the ground and instead of being independent of the camera as shown in FIGS. 1 and 2. But in both cases at least one face of the reflector has an opening and fixing members located opposite this opening for mounting an external light source or flash unit. Thus in the example shown in FIGS. 1 and 2, two faces 1a and 1b of the reflector are provided with an opening 10a or 10b of the type just mentioned.

The external face of at least one reflector face, namely face 1a in the example shown in FIGS. 1 and 2, carries a support 11 which is capable of receiving a lighthead 12. This light source can be fixed in position by means of screws 13 or any other suitable components. It should be noted that the front face of this lighthead is placed at a short distance to the rear with respect to the corresponding opening 10a.

Support 11 is preferably designed to permit adjustable orientation of light source 12 which can thus be oriented towards the opposite face 1c of the reflector or if desired towards the subject to be photographed. The dimensions of the opening 10a are such that, in the case just mentioned the reflector of lighthead 12 can be partly engaged within the reflector 1 in accordance with the invention.

Moreover, mounting components are also provided for fitting diffusers or color filters in front of light source 12.

The surface 1b in which is formed opening 10b can also be provided with a support 11 for mounting a second light source 12 which may be similar to the first. However, this surface can also be provided with a simple guide system 14 for mounting a movable slide 15 which serves to close-off opening 10b.

Other functions are performed by the opening when a light source is not placed behind the latter. In the first place, said opening makes it possible to take exposure meter measurements, either in reflected light through the opening 10b or in incident light by inserting an exposure meter within reflector 1. However, in the case of a camera which is fitted on one side with a viewfinder, said opening can be employed for using its viewfinder in order to be sure that the camera is aimed correctly.

Finally, in the case of a photograph taken at a very short distance from certain objects, opening 10b enables the photographer to introduce his hand inside reflector 1 in order to move the objects.

If so required, an opening of this type can be provided on each face of the pyramidal reflector 1. In such a case, some of these openings are equipped with a support for mounting an externally-placed light source whilst other openings are simply fitted with slides.

In the event that the reflector has two openings, a flash unit without a built in modelling lamp can be placed at one opening whilst a continuous light source is placed at the other opening. This will permit the photographer to see high lighting effects.

Figure 5:
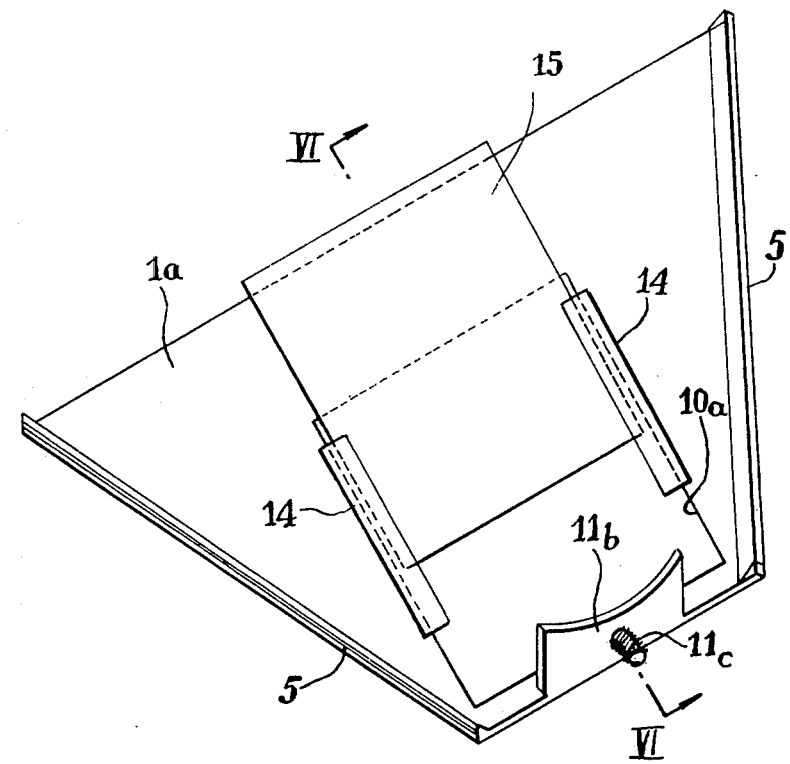
FIG. 5 is a view in perspective showing one of the wall elements constituting the body of the corresponding reflector.
Figure 6:
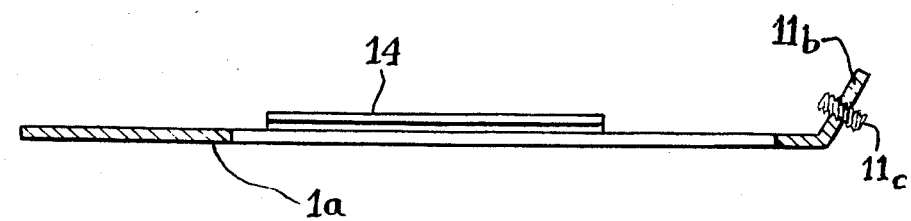
FIG. 6 is a sectional view taken along line VI—VI of FIG. 5.

An opening of this type can be provided, however, in only one wall of the reflector. This is the case in the example of construction shown in FIGS. 3 and 4 in which only wall 1a is provided with an opening 10a whilst a flash unit 12a is placed at the exterior. The housing of the flash unit is fixed on the body of the corresponding reflector by suitable fastening means such as, for example, a support 11a which is in turn fixed on a lug 11b by means of screw 11c (FIGS. 5 and 6).

In this form of construction, wall 1a provided with the opening 10a is also fitted with a movable slide 15 which is mounted within a guide system 14 and serves to adjust the cross-sectional area of said opening.

In the two forms of construction which are illustrated in the drawings, light rays emitted by light source 12 (shown in FIGS. 1 and 2) or by flash unit 12a (shown in FIGS. 3 and 4) are projected directly onto the opposite face 1c of the corresponding pyramidal reflector 1 or 1d. Some of these rays undergo a number of successive reflections, thus ensuring distribution of the light over the entire surface of this reflector. The light projected onto the subject to be photographed or filmed therefore comes from practically the entire surface of said reflector. Peripheral lighting is thus obtained from an extremely large area which can be of the order of 1,000 to 15,000 cm$^2$ if so desired.

As has been mentioned in the foregoing, this makes it possible to obtain a much softer light without any bright reflections. The light emanating from the device under consideration is completely homogeneous and without any hot points. However, by rotating the lighthead and illuminating the subject more and more directly, it is possible to vary the lighting effect thus changing the quality of the light from a very soft lighting effect to a relatively harsh effect of direct light, this variation being performed continuously.

This device can be employed with practically all picture-taking lenses of various types such as photographic cameras, motion-picture cameras and television cameras. However, the angle of view of the camera must be smaller than the angle of inclination of the faces of the pyramidal reflector 1.

The device in accordance with the invention can be employed for taking pictures either at very short distances of the order of 15 to 35 centimeters, for example, or at distances of several meters from the corresponding subject.

The light from the light source or light sources employed cannot possibly reach the camera lens since they are located at the exterior and the walls of the reflector 1 are opaque.

As mentioned earlier, the two embodiments which have been described in the foregoing are given solely by way of example. In fact, reflector 1 can assume many other shapes so as to provide an increasing cross-section towards the front and an inclination of the reflector wall or walls in the direction of the subject to be photographed or filmed. The reflector can thus have a prismatic shape or a conical or spherical shape but many other alternatives may be contemplated such as an elliptical, parabolic or trapezoidal shape or profile, for example. Moreover, the internal walls of the reflector need not be smooth but can be provided with facets or any other special and suitable configuration which is intended to increase the quantity of light reflected in the forward direction.

What I claimed is:

1. In combination with a light source and with a camera having a lens, a lighting device comprising: an opaque reflector of truncated shape having a base wall formed with an opening and a side wall flaring outwardly from said base wall and formed with a pair of offset lightpassing windows; said reflector with said opening aligned with said lens, whereby said camera can take a picture through said opening; means for securing said light source outside said reflector at one of said windows in a position wherein light emitted by said source is reflected by the interior of said reflector at an object viewable by said camera through said opening, said light source being out of line with said lens in said position; and means including a guide on said reflector and an opaque slide displaceable along said guide across a one of said windows for varying the amount of light passing through the thus equipped window.

2. The lighting device defined in claim 1 wherein said side wall is formed of at least one panel displaceable between a flat and a nonflat position.

3. The lighting device defined in claim 1 wherein said side wall is formed of a plurality of polygonal panels having edges, whereby said reflector is shaped as a truncated pyramid, said device further comprising means at said edges permitting said reflector to be folded flat.

4. The lighting device defined in claim 3 wherein said means at said edges includes hinges.

5. The lighting device defined in claim 4 wherein said hinges are flexible tapes and said panels are rigid and have reflective surfaces.

6. The lighting device defined in claim 3 wherein said means for holding includes means for securing said end wall to said camera.

7. The lighting device defined in claim 3 wherein said walls have reflective inner surfaces.

8. The lighting device defined in claim 1 wherein said guide is provided at one of said windows and said light source at the other window.

* * * * *